(12) United States Patent
Oberheim

(10) Patent No.: US 7,814,666 B2
(45) Date of Patent: Oct. 19, 2010

(54) LINKAGE DRIVE MECHANISM FOR A RECIPROCATING TOOL

(75) Inventor: Stephen C. Oberheim, Des Plaines, IL (US)

(73) Assignee: Robert Bosch GmbH, Stuttgart (DE)

( * ) Notice: Subject to any disclaimer, the term of this patent is extended or adjusted under 35 U.S.C. 154(b) by 386 days.

(21) Appl. No.: 11/707,196

(22) Filed: Feb. 13, 2007

(65) Prior Publication Data

US 2008/0189961 A1 Aug. 14, 2008

(51) Int. Cl.
*B27B 3/12* (2006.01)
(52) U.S. Cl. .......................... 30/393; 30/392
(58) Field of Classification Search ............... 30/166.3, 30/392, 393, 394, 522, 218, 223; 74/86, 74/87, 89
See application file for complete search history.

(56) References Cited

U.S. PATENT DOCUMENTS

| | | | |
|---|---|---|---|
| 1,035,524 A | 8/1912 | Bradley | |
| 2,547,922 A | 4/1951 | Bechtold | |
| 2,601,788 A * | 7/1952 | Parker | 74/40 |
| 2,619,131 A | 11/1952 | Vulliet-Durand | |
| 2,619,174 A * | 11/1952 | Neale | 82/71 |
| 2,703,017 A * | 3/1955 | Smith | 74/86 |
| 2,793,661 A * | 5/1957 | Olson | 30/393 |
| 2,858,701 A * | 11/1958 | Willcox | 74/22 R |
| 3,155,128 A * | 11/1964 | Godfrey et al. | 83/748 |
| 3,280,683 A * | 10/1966 | Djurberg | 83/454 |
| 3,496,972 A * | 2/1970 | Rees | 30/376 |
| 3,945,120 A | 3/1976 | Ritz | |
| 4,498,450 A * | 2/1985 | Klein | 125/16.01 |
| 4,941,367 A | 7/1990 | Konves | |
| 4,989,488 A | 2/1991 | Potzsch | |
| 5,025,562 A | 6/1991 | Palm | |
| 5,212,887 A | 5/1993 | Farmerie | |
| 5,450,925 A | 9/1995 | Smith et al. | |
| 5,555,626 A * | 9/1996 | Fuchs | 30/393 |
| 5,940,977 A | 8/1999 | Moores, Jr. | |
| 6,212,781 B1 * | 4/2001 | Marinkovich et al. | 30/394 |
| 6,249,979 B1 | 6/2001 | Bednar et al. | |
| 6,286,217 B1 | 9/2001 | Dassoulas | |
| 6,568,089 B1 | 5/2003 | Popik et al. | |
| 6,634,107 B2 | 10/2003 | Osada | |
| 6,662,455 B2 | 12/2003 | Tachibana et al. | |
| 6,688,005 B1 | 2/2004 | Tachibana et al. | |
| 6,742,267 B2 | 6/2004 | Marinkovich et al. | |
| 6,772,662 B2 | 8/2004 | Marinkovich et al. | |

(Continued)

FOREIGN PATENT DOCUMENTS

EP 1031395 8/2000

(Continued)

*Primary Examiner*—Jason Daniel Prone
*Assistant Examiner*—Jennifer Swinney
(74) *Attorney, Agent, or Firm*—Greer, Burns & Crain, Ltd.

(57) ABSTRACT

Preferred embodiments of a reciprocating drive apparatus are disclosed that comprise a housing, a rotatable drive shaft assembly located in the housing an elongated plunger located in the housing for reciprocating motion, the plunger having a front end portion for attaching a tool thereto, a rotary joint rocker mechanism supported in the housing and operatively connected to the plunger and the drive shaft assembly so that rotation of the drive shaft assembly produces reciprocating motion of the plunger. Another preferred embodiment includes a reciprocating counterweight.

16 Claims, 8 Drawing Sheets

U.S. PATENT DOCUMENTS

| | | | |
|---|---|---|---|
| 6,877,235 B2 * | 4/2005 | Osada | 30/394 |
| 7,096,589 B2 | 8/2006 | Phillips et al. | |
| 7,096,590 B2 | 8/2006 | Marinkovich et al. | |
| 7,117,601 B2 | 10/2006 | Hai-Chun | |
| 7,188,425 B2 * | 3/2007 | Bednar et al. | 30/377 |
| 7,216,433 B2 * | 5/2007 | Haas et al. | 30/393 |
| 7,331,407 B2 * | 2/2008 | Stirm et al. | 173/201 |
| 7,448,137 B2 * | 11/2008 | Neitzell et al. | 30/392 |
| 2001/0007300 A1 * | 7/2001 | Svejkovsky et al. | 198/769 |
| 2002/0138991 A1 | 10/2002 | Tachibana et al. | |
| 2003/0009888 A1 | 1/2003 | Marinkovich et al. | |
| 2003/0051352 A1 | 3/2003 | Clark, Jr. | |
| 2004/0187324 A1 * | 9/2004 | James et al. | 30/394 |
| 2004/0231170 A1 * | 11/2004 | Neitzell et al. | 30/340 |
| 2006/0090348 A1 * | 5/2006 | Jiao | 30/166.3 |
| 2006/0180117 A1 * | 8/2006 | Maezuru et al. | 123/196 R |
| 2007/0074408 A1 * | 4/2007 | Zhang | 30/392 |
| 2008/0047150 A1 | 2/2008 | Phillips et al. | |
| 2008/0189961 A1 | 8/2008 | Oberheim | |

FOREIGN PATENT DOCUMENTS

| | | |
|---|---|---|
| EP | 1203628 | 5/2002 |
| EP | 1277535 | 1/2003 |
| EP | 1593448 | 11/2005 |
| FR | 921857 | 12/1945 |
| GB | 432063 | 7/1935 |
| GB | 2042973 A * | 10/1980 |
| GB | 2256905 | 12/1992 |
| GB | 2340438 | 2/2000 |
| GB | 2415661 | 1/2006 |
| WO | WO 00/21707 | 4/2000 |

* cited by examiner

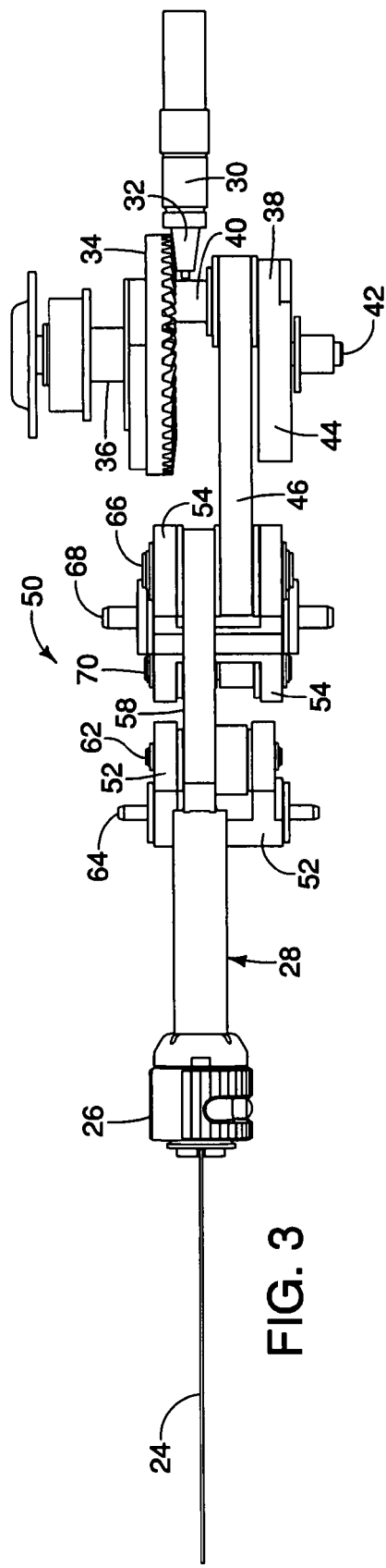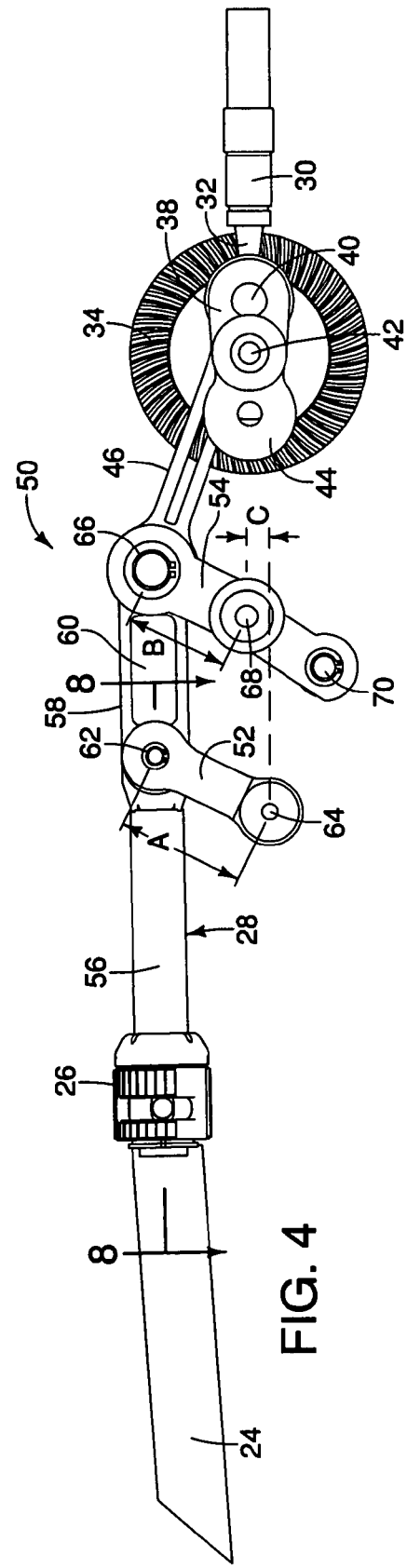

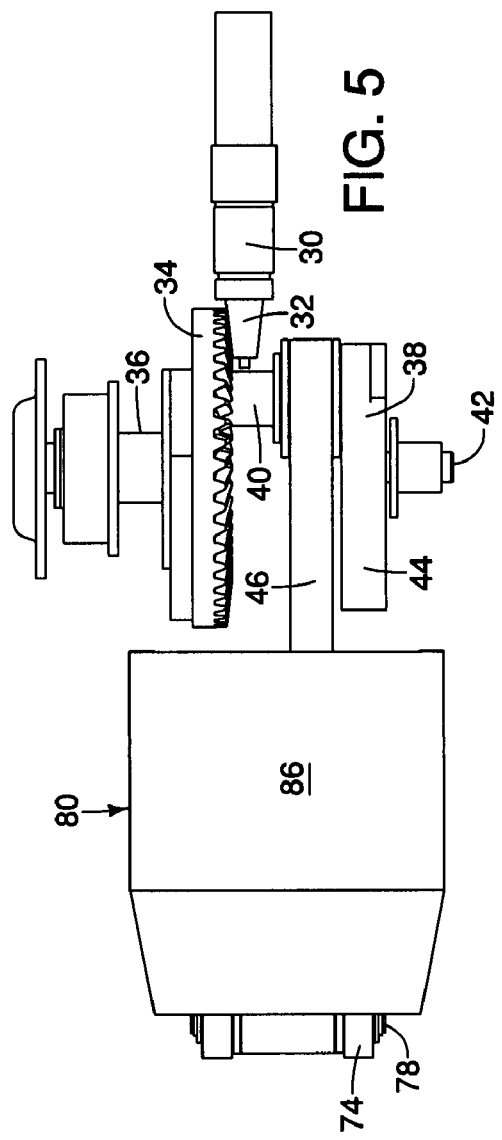
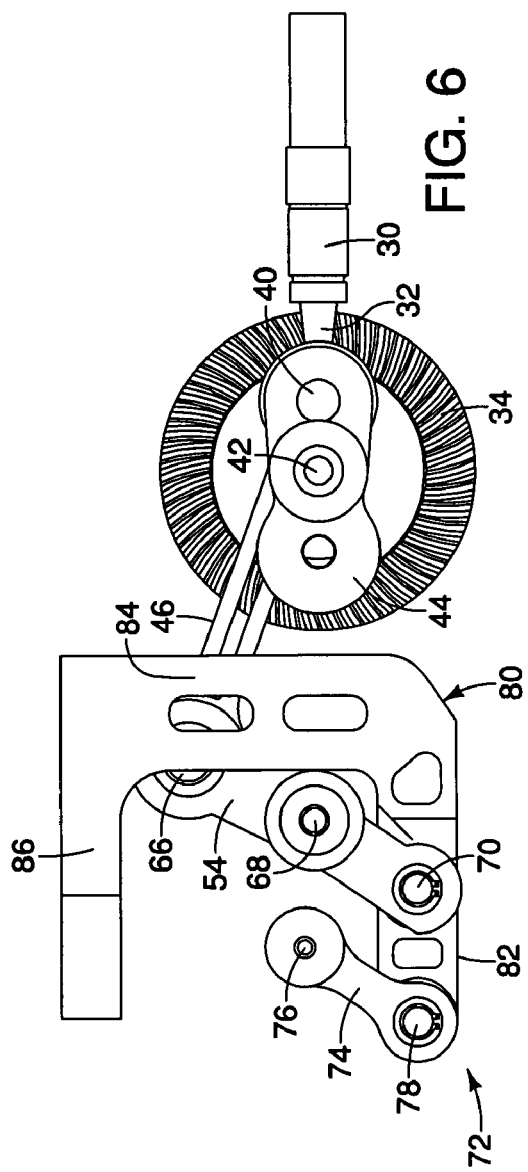

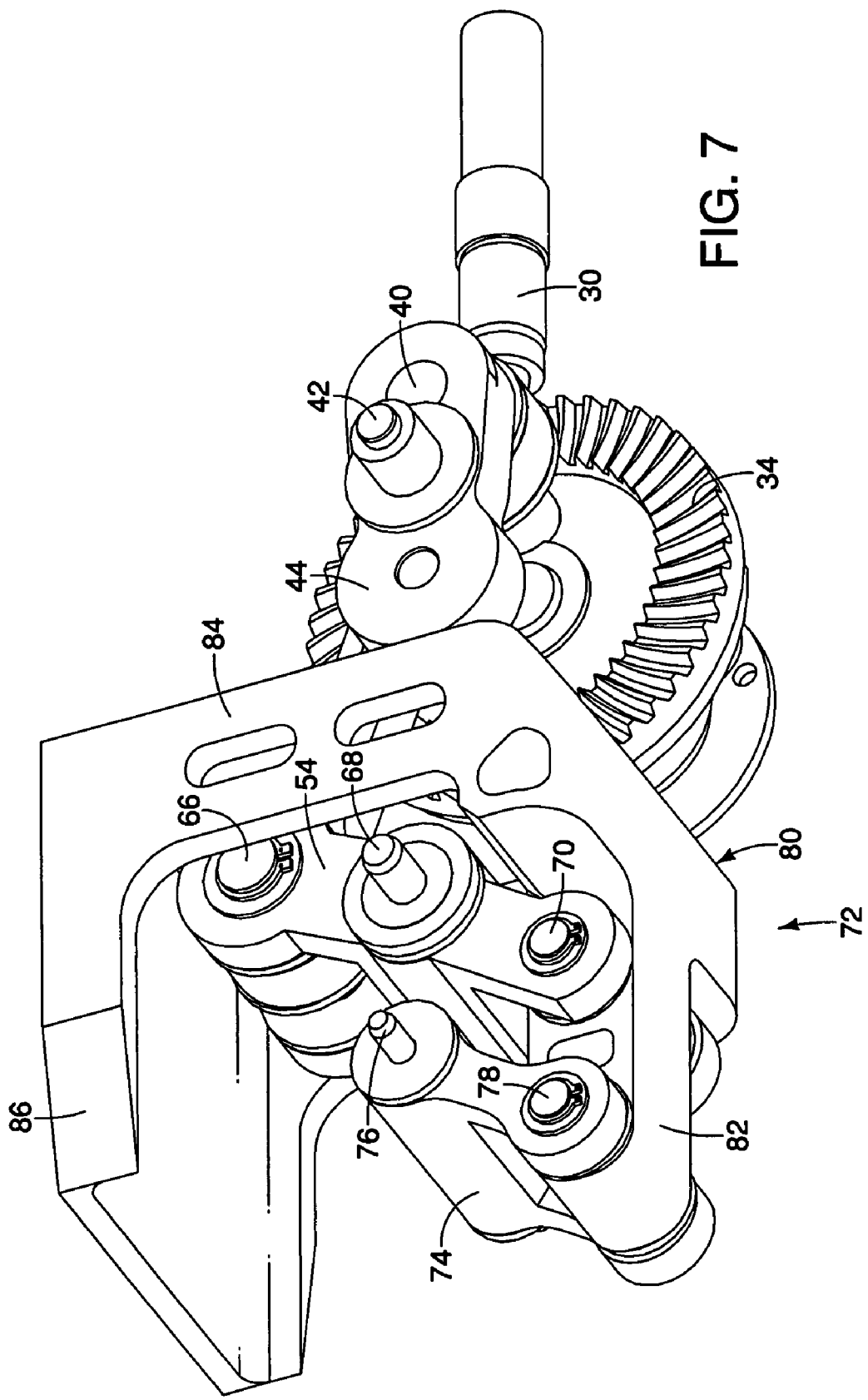

LINKAGE DRIVE MECHANISM FOR A RECIPROCATING TOOL

BACKGROUND OF THE INVENTION

The present invention generally relates to power hand tools, and more particularly, to power reciprocating tools.

Reciprocating tools that are motor driven, such as saber saws, larger reciprocating saws and the like are usually driven by electric motors that have a rotating output shaft. The rotating motion is translated into reciprocating motion for moving a saw blade or the like in a reciprocating manner.

Reciprocating tools such as jigsaws, saber saws, as well as larger reciprocating saws are typically driven by the rotating output shaft of an electric motor. Such tools have a mechanism that translates rotary motion of the output shaft into reciprocating motion. With the recent emphasis on tool portability, drive motors are increasingly powered by rechargeable battery packs, and even relatively large reciprocating saws are now being powered by such battery packs. Because larger saws are often used for heavy duty jobs, it is important for the run time of the batteries between charges be sufficient that the user does not have to frequently change out and recharge the battery packs while working. Therefore, it is important that the design of such tools contributes to efficient operation.

Typical reciprocating saws have a plunge rod or plunger that is guided in its reciprocating movement by sliding in metal guide bushings. One of the bushings is nearly always located at the very front of the saw and is exposed to dust and debris during operation of the saw. The front bushing typically becomes loaded with dirt and also receives very little grease. Generally, poor lubrication combined with the high coefficient of friction that sliding bushings typically have results in considerable friction heating and power loss. Sliding plunge rod action in guide bushings typically wastes 50% or more of the power used in operation because of the sliding friction. If the design is one that has counterweights to reduce vibration, such counterweights are also often designed to slide in steel guide bushings. This therefore increases waste of energy and accordingly, most commercially available battery powered reciprocating saws at the present time simply do not have counterweights. This is undesirable because the absence of counterweights substantially increases the vibration that is experienced by a user during operation.

SUMMARY OF THE INVENTION

One preferred embodiment of the present invention is a drive apparatus for a reciprocating tool that comprises a housing, a rotatable drive shaft assembly located in the housing an elongated plunger located in the housing for reciprocating motion, the plunger having a front end portion for attaching a tool thereto, a rotary joint rocker mechanism supported in the housing and operatively connected to the plunger and the drive shaft assembly so that rotation of the drive shaft assembly produces reciprocating motion of the plunger.

Another preferred embodiment is a drive apparatus for a reciprocating tool that comprises a housing, a rotatable drive shaft assembly located in the housing, an elongated plunger located in the housing for reciprocating motion, the plunger having a front end portion for attaching a tool thereto, a rotary joint rocker mechanism having an associated counterweight supported in the housing and operatively connected to the plunger and the drive shaft assembly so that rotation of the drive shaft assembly produces reciprocating motion of the plunger along a first desired path and reciprocating motion of the counterweight along a second desired path, the reciprocating motion of the counterweight being in an opposite direction of the reciprocating motion of the plunger to reduce vibration produced during operation of the apparatus, the mechanism producing motion of the plunger and counterweight along their respective desired paths without incurring any sliding friction being produced in the mechanism.

DESCRIPTION OF THE DRAWINGS

FIG. 3 is a top view of another preferred embodiment of the present invention;

FIG. 4 is a side view of the embodiment shown in FIG. 3;

FIG. 5 is a top view of a portion of the preferred embodiment shown in FIG. 1;

FIG. 6 is a side view of the portion of the embodiment shown in FIG. 5;

FIG. 7 is a side perspective view of the portion of the preferred embodiment shown in FIGS. 5 and 6;

DETAILED DESCRIPTION

Figure 1:
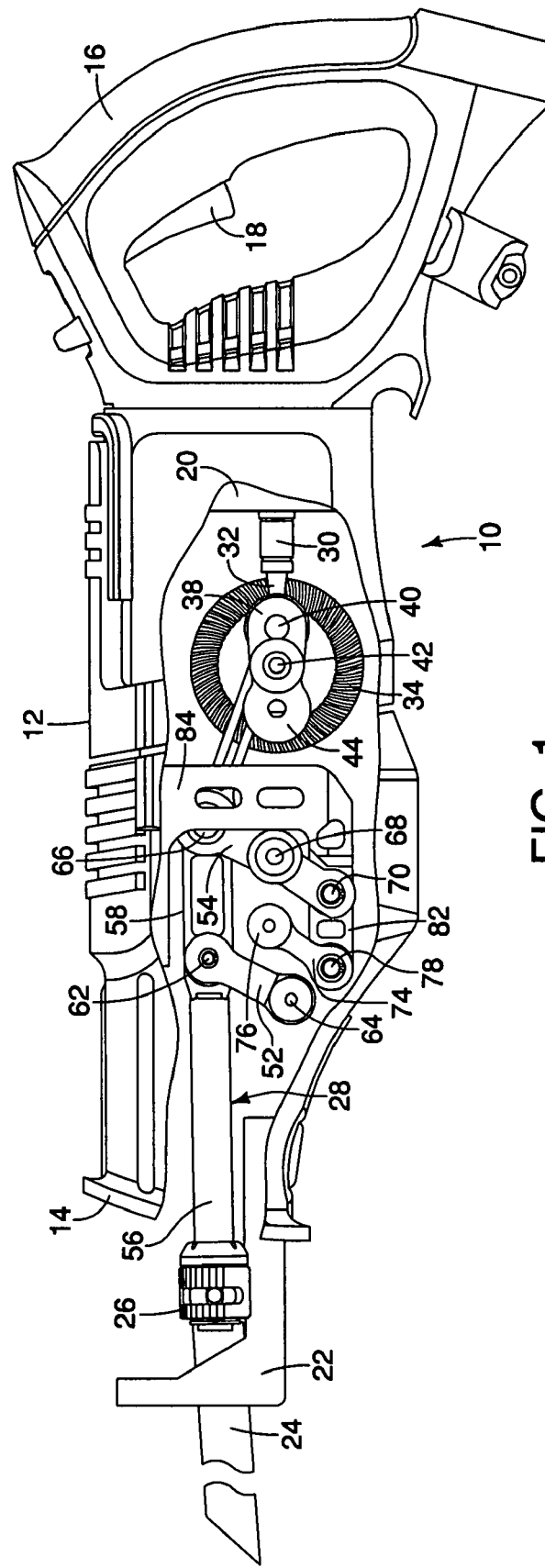
FIG. 1 is a side view of a preferred embodiment of the present invention incorporated into a relatively large reciprocating saw and is shown with portions of the housing cut away to reveal the construction of the embodiment.

The preferred embodiments of the present invention are reciprocating drive mechanisms for a reciprocating tool such as a reciprocating saw, the general size and shape of which is similar to saws that are currently marketed. The present invention is also applicable for other types of tools such as saber saws, for example, or other types of tools that have a reciprocating action and are powered by a motor having a rotating output shaft.

As previously mentioned, because most commercially available reciprocating saws utilize a plunge rod that is guided in bushings, wherein sliding friction can consume 40% to 50% of the motor power. Sliding friction of counterweights in similar bushings can consume another 15%-20% of the motor power. Such sliding friction also causes the saw mechanism to run at higher temperatures which has the attendant effect of decreasing the life of lubricating grease in the tool and therefore decreasing the tool life.

The preferred embodiments of the present invention that are shown and described herein do not utilize guide bushings for guiding either the plunge rod or a counterweight if the preferred embodiment has a counterweight. The preferred embodiments shown and described herein utilize linkage mechanisms that have pivot connections rather than sliding components. There are significant multiple advantages including a longer run times for saws that are powered by battery packs, smaller and less expensive motors that can run at higher speeds at cooler temperatures and demonstrated improved durability. The tools can also have reciprocating counterweights that substantially reduce the amount of vibration that is generated during operation of the saw.

By employing a guide rod guiding mechanism that utilizes linkage mechanisms with needle bearings rather than poorly lubricated guide bushings, saw power consumption can be reduced by approximately 45% which leads to an approximately 80% increase in run time for a cordless, i.e., battery pack driven saw. Lowering the generated friction also lowers the operating temperature of the tool and thereby increases the comfort of the user. Significantly, linkage driven reciprocating saws can also employ counterweights with very little power loss for the reason that the counterweights are also guided by linkage mechanisms and do not require slide bushings in their design. It is expected that impending revised vibration standards will be implemented for various tools, including reciprocating saws, in the near future which will likely not be met without the employment of counterweights in their design.

While the preferred embodiments illustrated herein employ a rotatable drive shaft assembly that has an input shaft from a motor that has a pinion gear that drives a spiral gear and associated crank arm, with the crank arm driving a connecting rod to a rotary joint rocker mechanism, it should be understood that other types of rotatable drive shaft assemblies can be used, such as a scotch yoke drive, a barrel cam, gear drive or wobble arm drive, all of which are known to those of ordinary skill in the art.

Turning now to the drawings, as shown in FIG. 1, a reciprocating saw, indicated generally at 10, has an outer housing 12 which includes a nose portion 14 and a rear handle 16. A trigger switch 18 is provided in the handle portion for turning on a motor 20 that drives the tool. The saw has a shoe 22 at the nose end portion 14 and a saw blade 24 is mounted in a blade clamping mechanism 26 that is mounted at the end of an elongated plunger, indicated generally at 28. The motor 20 has an output shaft 30 to which a pinion gear 32 is attached, and it engages and drives a spiral gear 34.

As is best shown in FIGS. 3 and 4, the spiral gear 34 is mounted on shaft 36 and is also connected to a crank arm 38 by a post 40 so that the crank arm rotates with the spiral gear 34. The crank arm 38 is mounted for rotation on a shaft 42. The crank arm has a second lobe portion 44 that is provided on the end opposite the end having the post 40 for the purposes of balancing the crank arm. The post 40 also acts as a pivot for a connecting rod 46 that is pivotally connected to the post 40 and provides the output to a rotary joint rocker mechanism, indicated generally at 50.

The rotary joint rocker mechanism 50 is comprised of a forward plunger guide rocker 52 and a plunger drive rocker 54 that is spaced rearwardly from the plunger guide rocker 52. The plunger 28 has a cylindrical portion 56 to which the clamping mechanism 26 is attached and it also has a relatively flat rear portion 58 with a weight reducing window 60. The plunger guide rocker 52 has a upper pivot connection 62 that interconnects the upper end portion of the rocker 52 to the rear portion 58 of the plunger 28 and a lower pivot connection 64 that connects the bottom portion of the plunger guide rocker 52 to the housing 12.

Figure 2:
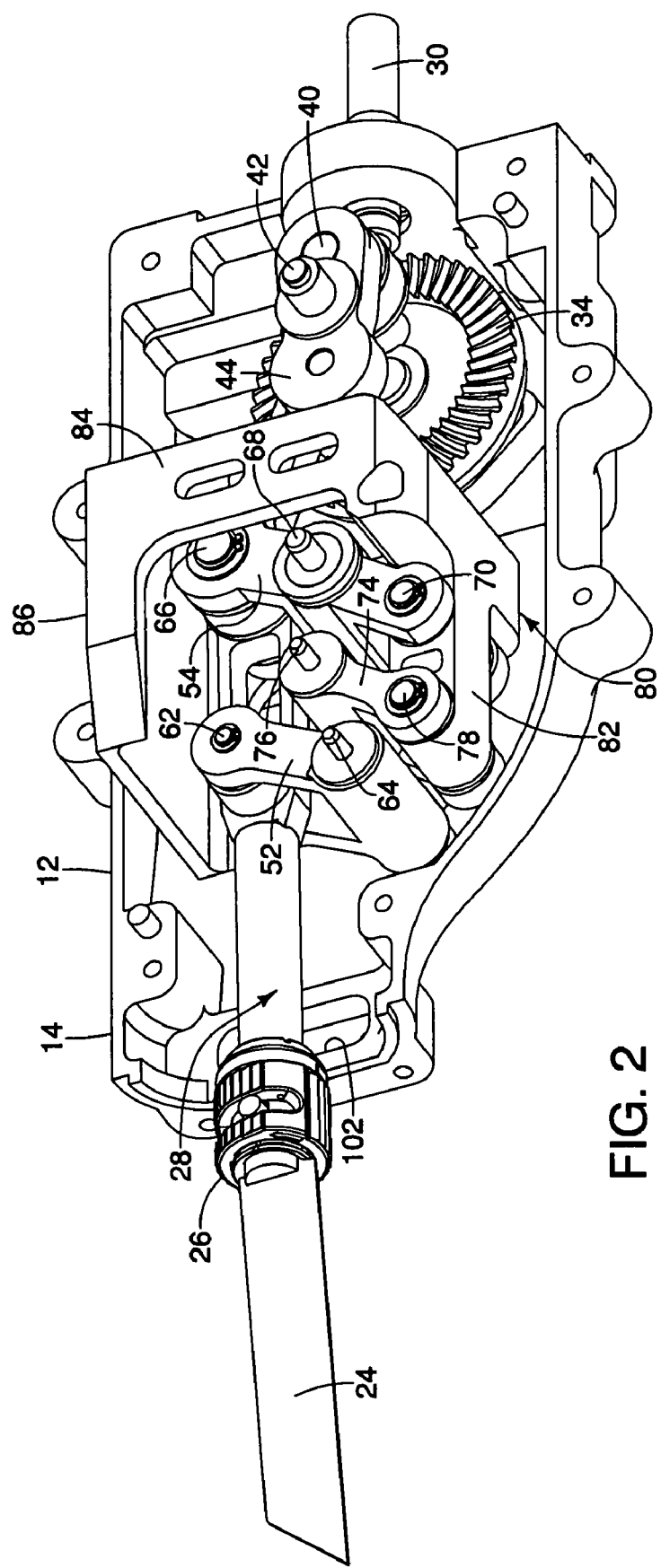
FIG. 2 is a left side perspective view of the preferred embodiment shown in FIG. 1.

The plunger drive rocker 54 has an upper pivot connection 66 which connects the drive rocker to the rear portion 58 of the plunger 28 as well as to the outer end of the connecting rod 46. The plunger drive rocker 54 has a pivot connection 68 generally midway between its upper and lower end portions which is also connected to the housing 12. Additionally, the plunger drive rocker 54 has a lower pivot connection 70 that is not shown to be connected to anything in this embodiment but which is connected to part of a counterweight assembly which is provided in the embodiment shown in FIGS. 1 and 2 and which will be hereinafter described.

From the foregoing, it should be understood that rotation of the spiral gear 34 causes the crank arm 38 to rotate which results in the connecting rod 46 moving the plunger drive rocker 54 from the position shown in FIG. 4 to the left and thereby causes the plunger 28 to be moved to the left. The saw blade 24 is therefore moved in a reciprocating manner with the stroke of movement preferably being approximately 1" to approximately 1¼", the stroke distance being a function of the distance between the center of the post 40 and shaft 42.

During reciprocating motion of the plunger 56, the configuration of the rotary joint rocker mechanism provides an orbital movement of the blade 24 during operation. As is known to those of ordinary skill in the art, the orbital action aids in cutting a workpiece during operation. The amount of orbital action varies as the orientation and length (i.e., the distance between pivot connections, marked as A and B in FIG. 4) of the rockers 52 and 54 are changed relative to one another. As is also evident from FIG. 4, the elevation of the pivot connection 68 is higher than the pivot connection 64 by an amounted marked as "C" in FIG. 4. This elevation difference as well as changes in the distances A and B can alter the path of orbital motion of the blade. The interaction of these dimensions is complex and the exact path of the blade 24 can be varied by changing the dimensions of these distances relative to one another.

Also, it is possible to change the orbital path by moving the pivot connection 64 to the left or right or up and down from the location that is shown in FIG. 4, as well as varying the distance between the pivot connections 62 and 66. The pivot connection 64 is shown in this embodiment to be secured in the housing 12, but it is within the scope of the invention to provide a linkage secured in the housing that enables the position of the pivot connection 64 to be changed by a lever or the like which would increase or decrease the amount or orbital motion that is carried out by the rotary joint rocker mechanism 50.

The embodiment of FIG. 1 is also illustrated in FIGS. 5, 6 and 7 which has a counterweight assembly, indicated generally at 72, and comprises a counterweight guide rocker 74 having an upper pivot connection 76 and a lower pivot connection 78, with the upper pivot connection 76 being connected to the housing 12. The lower pivot connection 78 is connected to a counterweight structure, indicated generally at 80, that has a bottom tongue portion 82 that is connected to the guide rocker 74 as well as the lower portion of the plunger drive rocker 54. The counterweight structure 80 extends rearwardly (to the right as shown) and has an enlarged opening defined by sidewall portions 84 that extend upwardly to a top portion 86. The opening is large enough that the counterweight structure 80 surrounds but does not interfere with the operation of the rotary joint rocker mechanism 50. The counterweight structure 80 also extends forwardly over the tongue portion 82.

Importantly, the counterweight structure 80 is supported only by pivot connections 70 and 78 which guide the counterweight structure 80 in a reciprocating path that is opposite that of the plunger 28. The configuration of the counterweight structure 80 provides inertia forces that are approximately equal to those that are generated by the plunger mechanism 50 which will substantially reduce vibration during operation. Also, the counterweight structure 80 is also configured so that the distribution of mass provides a center of mass that is approximately in line with the plunger axis which also contributes to the reduction in vibration to a user. Since there is no sliding contact by the counterweight structure, there is very little waste of energy caused by friction.

Figure 8:
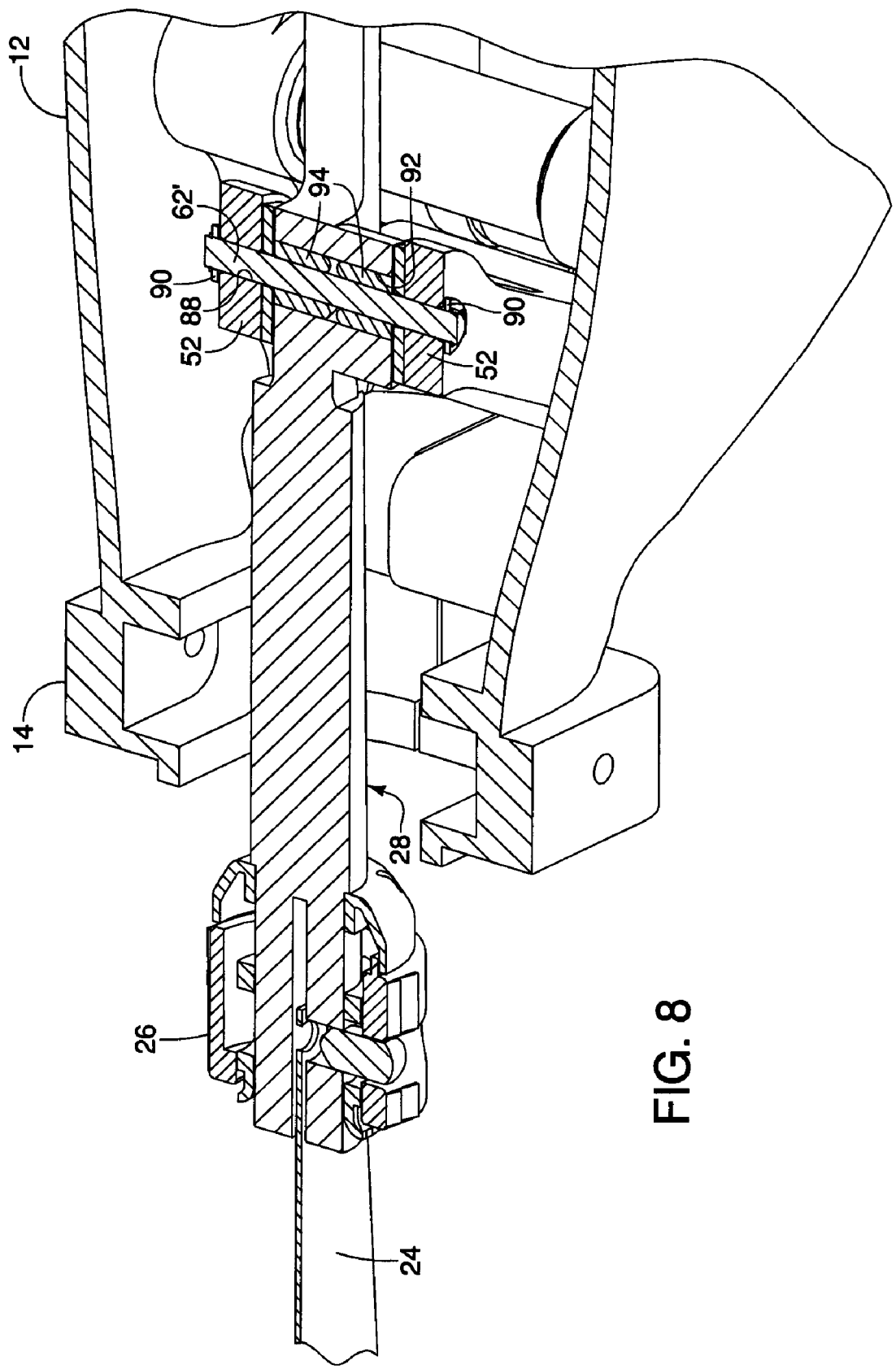
FIG. 8 is a perspective of a portion of the preferred embodiment shown in FIG. 1, partially in section (without section lines being shown) taken generally along the line 8-8 of FIG. 4 to illustrate the construction of a front pivot connection.
Figure 11:
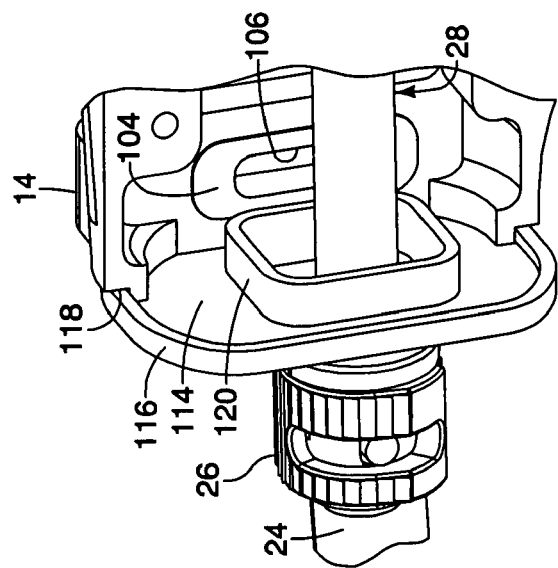
FIG. 11 is another view similar to FIG. 10 with a seal block removed.
Figure 10:
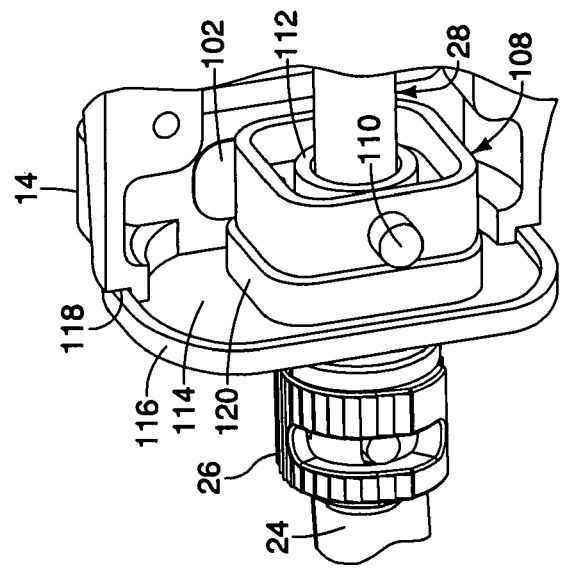
FIG. 10 is another view similar to FIG. 9, but with a guide channel removed.
Figure 9:
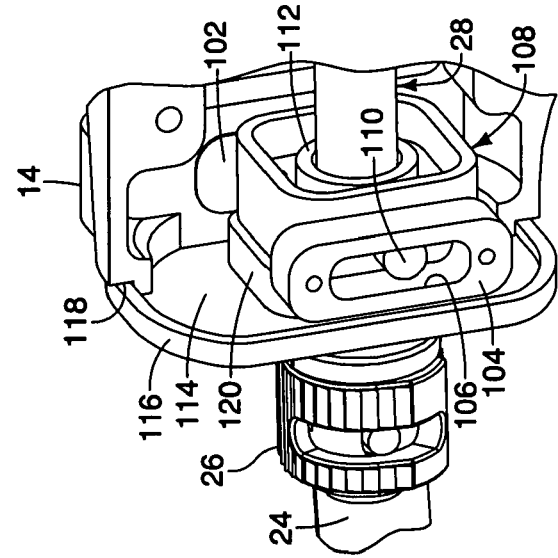
FIG. 9 is an enlarged perspective view of the front end portion of the housing shown in FIG. 2 and including components of the sealing assembly.

The only substantial friction that is experienced is in the pivot connections and that is minimized by the preferred use of needle bearings in the pivot connections. There is a very small amount of friction in the side washers on either side of the rocker and a very small amount of friction in the lip seal. In this regard and referring to FIG. 8 which is a perspective view of a cross section taken generally along the line 8-8 of FIG. 4 through the center of the plunger 28 and the pivot connection 62, there is shown a shaft 62' that is snugly fit in apertures 88 on both sides of the plunger guide rocker 52. The outer ends of the shaft 62 are retained by snap rings 90 and the plunger 28 has an enlarged opening 92 in which a pair of needle bearings 94 are located.

The needle bearings greatly reduce any friction and can withstand relatively high loading forces. While all of the pivot connections that have been described preferably have at least one needle bearing, it is preferred that two needle bearings be used in the pivot connection 62 which is at the forward end of the plunger 28. When the reciprocating saw is being used to cut a circular hole, for example, there may be a torque applied to the blade 24 and therefore to the plunger 28 and the use of two needle bearings in this pivot connection resists the twisting of the plunger 28 which is desired to minimize the potential damage to the rotary joint rocker mechanism 50.

Alternatively, the rotary joint needle bearings can be replaced by compliant joint mechanisms, which are generally similar to thin extremely durable leaf springs. Their use in a rotary joint rocker mechanism such as disclosed in the illustrated embodiments shown and described herein would be possible because the angular rotation of the rockers disclosed herein are within approximately plus or minus 20 degrees of movement which can be achieved with such compliant joint mechanisms. An advantage of their use is that they are essentially immune to the effects of dirt and grime and do not have to be lubricated.

As is best shown in FIGS. 9-12, the nose portion 14 of the housing 12 has a sealing assembly, indicated generally at 100. The nose portion 14 has two recessed portions, one of which is shown at 102 in the illustrated half of the housing 12, each of which is configured to receive a guide channel 104 which has an internal slot 106 which is configured to receive a portion of a seal block, indicated generally at 108, which is preferably made of a nylon or other strong plastic-like material. The seal block 108 has a generally square outer configuration with rounded corners, and the opposite sides thereof have a generally cylindrical protrusion 110 that is sized to fit within the slot 106 of the guide channel 104.

The seal block 108 has a cylindrical center portion 112 with an inside opening that is only slightly larger than the diameter of the plunger 28. Because the plunger 28 travels along an orbital path during operation, the seal block 108 is mounted in the nose portion 14 of the housing in a manner whereby the seal block can vertically move as well as pivot about the protrusions 110 located on each side of the seal block 108. The amount of vertical movement that can occur is a function of the length of the slot 106 in the guide channel 104, and that length is determined so that the seal block 108 does not constrain or otherwise bind the orbital movement of the plunger 28.

An elastic diaphragm 114 is also provided and it forms a static seal between the housing and the seal block 108. The diaphragm 114 is preferably made of silicon rubber but may be some other elastic material so long as it has the necessary flexibility and durability over time. The diaphragm 114 has an outer annular flange 116 that fits in a complementary shoulder 118 in the nose portion 14 and the overall configuration of the diaphragm 114 is rectangular with rounded corners as is evident. The diaphragm 114 also has an inner annular flange 120 that is slightly larger than the outside configuration of the seal block 108 so that it can slide onto the seal block 108 to form a static seal with the seal block 108. The flexibility of the diaphragm 114 is necessary so that it can move when the seal block 108 moves in response to orbital reciprocating action of the plunger 28.

Figure 12:
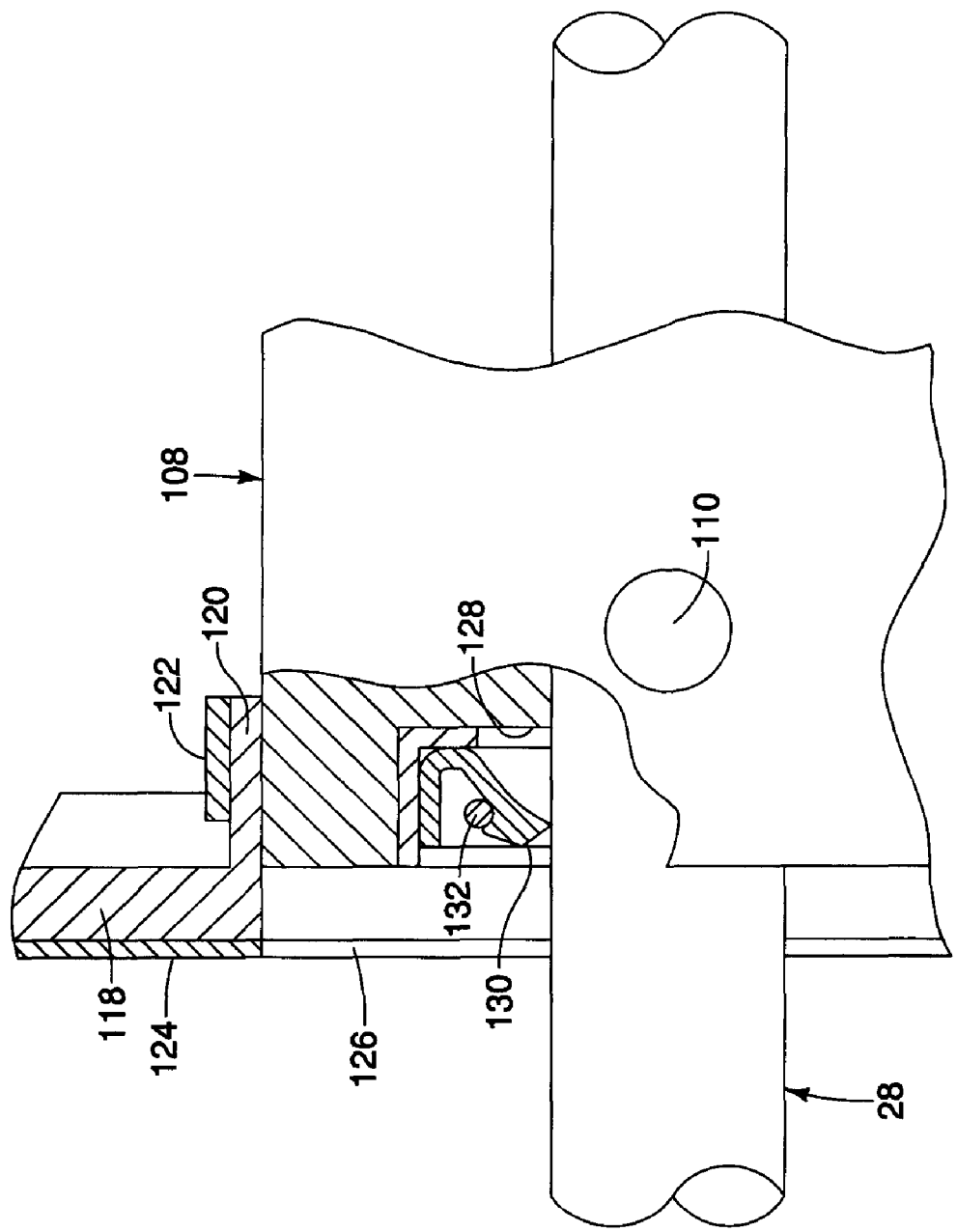
FIG. 12 is an enlarged side view of a portion of the sealing assembly shown in FIG. 9 with portions cut away to illustrate details of the construction of the sealing assembly.

As shown in FIG. 12, an outer band clamp 122 is used to hold the flange 120 in sealing engagement with the seal block 108. It is preferred that a metal plate 124 be provided to overlay the diaphragm 114, with the plate 124 having an opening 126 that is generally coextensive with the size of the seal block 108 so that the metal plate does not interfere with the movement of the plunger 28. The plate 124 is preferably rectangular and does not have the rounded corners as does the diaphragm 114 so that fasteners such as screws or the like can be used at the four corners to attach the metal plate to the nose portion 14 of the housing 12. By this construction, there are no screws or the like that penetrate the diaphragm 114 which could damage it and reduce its useful life.

The front portion of the seal block 108 has an annular recess 128 that contains a lip seal 130 that contacts the plunger 28. An annular spring 132 is provided to bias the lip seal 130 into contact with the plunger 28 to provide a dynamic seal for the plunger 28.

While various embodiments of the present invention have been shown and described, it should be understood that other modifications, substitutions and alternatives are apparent to one of ordinary skill in the art. Such modifications, substitutions and alternatives can be made without departing from the spirit and scope of the invention, which should be determined from the appended claims.

Various features of the invention are set forth in the following claims.

What is claimed is:

1. A drive apparatus for a reciprocating tool, comprising;
   a housing;
   a rotatable drive shaft assembly located in said housing;
   an elongated plunger located in said housing for reciprocating motion, said plunger having a front end portion for attaching a tool thereto;
   a rotary joint rocker mechanism supported in said housing and being operatively connected to said plunger at two spaced apart rotary joint locations along its length-and to said drive shaft assembly so that rotation of said drive shaft assembly produces reciprocating motion of said plunder without subjecting said plunger to any linear sliding friction.

2. A drive apparatus for a reciprocating tool as defined in claim 1 wherein said rocker mechanism further comprises a counterweight assembly having a movable counterweight, said mechanism being configured to support and move said counterweight in a reciprocating motion that is substantially in the opposite direction of said plunger.

3. A drive apparatus for a reciprocating tool as defined in claim 1 wherein said rotary joint rocker mechanism further comprises:
   a first guide rocker having an upper end portion with a pivot connection to said plunger and a lower end portion with a pivot connection to said housing;
   a second rocker having an upper end portion with a pivot connection to said plunger at a location spaced from said first guide rocker and a pivot connection to said housing that is spaced from said upper end portion.

4. A drive apparatus for a reciprocating tool as defined in claim 1 wherein said drive shaft assembly comprises a rotatable crank arm non-rotationally connected to a spiral gear that is driven by a drive pinion gear, said crank arm being connected to a connecting arm that is operatively connected to said plunger, whereby rotation of said pinion gear rotates said spiral gear and crank arm and causes said connecting arm to move said plunger in reciprocating motion.

5. A drive apparatus for a reciprocating tool, comprising;
a housing;
a rotatable drive shaft assembly located in said housing;
an elongated plunger located in said housing for reciprocating motion, said plunger having a front end portion for attaching a tool thereto;
a rotary joint rocker mechanism supported in said housing and operatively connected to said plunger and said drive shaft assembly so that rotation of said drive shaft assembly produces reciprocating motion of said plunger without any linear sliding friction; and
a counterweight assembly having a movable counterweight, said mechanism being configured to support and move said counterweight in a reciprocating motion that is substantially in the opposite direction of said plunger;
said rotary joint rocker mechanism further comprising:
a first guide rocker having an upper end portion with a pivot connection to said plunger and a lower end portion with a pivot connection to said housing;
a second rocker having an upper end portion with a pivot connection to said plunger at a location spaced from said first guide rocker and a housing pivot connection to said housing that is spaced from said upper end portion;
said second rocker having a lower extension below said housing pivot connection with a counterweight pivot connection to said counterweight;
a third rocker having one end portion having a pivot connection to said counterweight spaced from said counterweight pivot connection of said second rocker, an opposite end portion of said third rocker having a pivot connection to said housing.

6. A drive apparatus for a reciprocating tool as defined in claim 1 wherein said counterweight comprises a structure that extends from lower reaches of said rockers to beyond upper reaches of said rockers whereby the center of gravity of said structure is approximately coextensive with the plunger.

7. A drive apparatus for a reciprocating tool as defined in claim 1 further comprising a sealing assembly located in said housing near said front end portion of said plunger, said plunger having a cylindrical portion where it exits said housing, said sealing assembly having a rigid seal block with an opening slightly larger than said cylindrical portion, said seal block being retained in said housing and having at least two degrees of freedom of movement therein to permit non-linear plunger movement.

8. A drive apparatus for a reciprocating tool as defined in claim 7 wherein said housing has a vertical slot on opposite sides of said seal block and said seal block has a protrusion on each side thereof which engage a respective vertical slot, said seal block being pivotable about said protrusions and vertically movable therein.

9. A drive apparatus for a reciprocating tool as defined in claim 8 wherein said sealing assembly further comprises a flexible diaphragm located adjacent to said seal block.

10. A drive apparatus for a reciprocating tool as defined in claim 9 wherein said sealing assembly further comprises a first clamp for attaching said diaphragm to said seal block and a second clamp for attaching said diaphragm to said housing, said first and second clamps providing a static seal.

11. A drive apparatus for a reciprocating tool as defined in claim 10 wherein said sealing assembly further comprises a lip seal connected to said seal block and providing a sealing surface that engages said plunger to provide a dynamic seal.

12. A drive apparatus for a reciprocating tool as defined in claim 5 wherein said first guide rocker is closer to said front end portion of said plunger than said second rocker, said pivot connection of said guide rocker to said plunger comprising a shaft that extends through an aperture in said plunger and is secured at opposite ends in said first guide rocker and at least one bearing in said aperture between said shaft and said first guide rocker for resisting twisting of said plunger upon application of a twisting force on said plunger.

13. A drive apparatus for a reciprocating tool as defined in claim 12 wherein said at least one bearing comprises at least one needle bearing.

14. A drive apparatus for a reciprocating tool as defined in claim 13 wherein said at least one bearing comprises two needle bearings aligned with one another on said shaft.

15. A drive apparatus for a reciprocating tool, comprising;
a housing;
a rotatable drive shaft assembly located in said housing;
an elongated plunger located in said housing for reciprocating motion, said plunger having a front end portion for attaching a tool thereto;
a rotary joint rocker mechanism having an associated counterweight supported in said housing and operatively connected to said plunger at two spaced apart rotary joint locations along its length and to said drive shaft assembly so that rotation of said drive shaft assembly produces reciprocating motion of said plunger along a first desired path and reciprocating motion of said counterweight along a second desired path, the reciprocating motion of said counterweight being in an opposite direction of the reciprocating motion of said plunger to reduce vibration produced during operation of the apparatus;
said mechanism producing motion of said plunger and counterweight along their respective desired paths without said plunger and said counterweight incurring any sliding friction.

16. A drive apparatus for a reciprocating tool as defined in claim 15 wherein said counterweight has its mass distributed so that its center of mass is generally in line with the center of mass of said plunger.

* * * * *